US006847370B2

(12) United States Patent
Baldwin et al.

(10) Patent No.: US 6,847,370 B2
(45) Date of Patent: Jan. 25, 2005

(54) PLANAR BYTE MEMORY ORGANIZATION WITH LINEAR ACCESS

(75) Inventors: David Robert Baldwin, Weybridge (GB); Nicholas J. N. Murphy, The Sands (GB)

(73) Assignee: 3D Labs, Inc., Ltd., Hamilton (BM)

(*) Notice: Subject to any disclaimer, the term of this patent is extended or adjusted under 35 U.S.C. 154(b) by 173 days.

(21) Appl. No.: 10/080,284

(22) Filed: Feb. 20, 2002

(65) Prior Publication Data

US 2002/0126124 A1 Sep. 12, 2002

Related U.S. Application Data

(60) Provisional application No. 60/269,802, filed on Feb. 20, 2001.

(51) Int. Cl.[7] ................................................ G06F 12/00

(52) U.S. Cl. ........................ 345/564; 345/562; 345/565; 345/566; 345/570; 345/571

(58) Field of Search ................................ 345/564, 531, 345/533, 544, 560–566, 550, 571, 570

(56) References Cited

U.S. PATENT DOCUMENTS 5,311,211 A * 5/1994 Simpson ..................... 345/571
5,841,446 A * 11/1998 Dai ............................ 345/568

* cited by examiner

*Primary Examiner*—Matthew C. Bella
*Assistant Examiner*—Hau Nguyen
(74) *Attorney, Agent, or Firm*—Groover & Holmes

(57) ABSTRACT

A graphics memory architecture in which row addresses are permuted, in a basically tile-oriented storage architecture, so that fast parallel access is provided both by scanlines (for video operations) and also by tiles (for graphics operations).

6 Claims, 10 Drawing Sheets

| | | | | | | | | |
|---|---|---|---|---|---|---|---|---|
| Tile 7 | Row 0 | Row 7 | Row 6 | Row 5 | Row 4 | Row 3 | Row 2 | Row 1 |
| | Row 0 | Row 7 | Row 6 | Row 5 | Row 4 | Row 3 | Row 2 | Row 1 |
| | Row 0 | Row 7 | Row 6 | Row 5 | Row 4 | Row 3 | Row 2 | Row 1 |
| | Row 0 | Row 7 | Row 6 | Row 5 | Row 4 | Row 3 | Row 2 | Row 1 |
| Tile 6 | Row 1 | Row 0 | Row 7 | Row 6 | Row 5 | Row 4 | Row 3 | Row 2 |
| | Row 1 | Row 0 | Row 7 | Row 6 | Row 5 | Row 4 | Row 3 | Row 2 |
| | Row 1 | Row 0 | Row 7 | Row 6 | Row 5 | Row 4 | Row 3 | Row 2 |
| | Row 1 | Row 0 | Row 7 | Row 6 | Row 5 | Row 4 | Row 3 | Row 2 |
| Tile 5 | Row 2 | Row 1 | Row 0 | Row 7 | Row 6 | Row 5 | Row 4 | Row 3 |
| | Row 2 | Row 1 | Row 0 | Row 7 | Row 6 | Row 5 | Row 4 | Row 3 |
| | Row 2 | Row 1 | Row 0 | Row 7 | Row 6 | Row 5 | Row 4 | Row 3 |
| | Row 2 | Row 1 | Row 0 | Row 7 | Row 6 | Row 5 | Row 4 | Row 3 |
| Tile 4 | Row 3 | Row 2 | Row 1 | Row 0 | Row 7 | Row 6 | Row 5 | Row 4 |
| | Row 3 | Row 2 | Row 1 | Row 0 | Row 7 | Row 6 | Row 5 | Row 4 |
| | Row 3 | Row 2 | Row 1 | Row 0 | Row 7 | Row 6 | Row 5 | Row 4 |
| | Row 3 | Row 2 | Row 1 | Row 0 | Row 7 | Row 6 | Row 5 | Row 4 |
| Tile 3 | Row 4 | Row 3 | Row 2 | Row 1 | Row 0 | Row 7 | Row 6 | Row 5 |
| | Row 4 | Row 3 | Row 2 | Row 1 | Row 0 | Row 7 | Row 6 | Row 5 |
| | Row 4 | Row 3 | Row 2 | Row 1 | Row 0 | Row 7 | Row 6 | Row 5 |
| | Row 4 | Row 3 | Row 2 | Row 1 | Row 0 | Row 7 | Row 6 | Row 5 |
| Tile 2 | Row 5 | Row 4 | Row 3 | Row 2 | Row 1 | Row 0 | Row 7 | Row 6 |
| | Row 5 | Row 4 | Row 3 | Row 2 | Row 1 | Row 0 | Row 7 | Row 6 |
| | Row 5 | Row 4 | Row 3 | Row 2 | Row 1 | Row 0 | Row 7 | Row 6 |
| | Row 5 | Row 4 | Row 3 | Row 2 | Row 1 | Row 0 | Row 7 | Row 6 |
| Tile 1 | Row 6 | Row 5 | Row 4 | Row 3 | Row 2 | Row 1 | Row 0 | Row 7 |
| | Row 6 | Row 5 | Row 4 | Row 3 | Row 2 | Row 1 | Row 0 | Row 7 |
| | Row 6 | Row 5 | Row 4 | Row 3 | Row 2 | Row 1 | Row 0 | Row 7 |
| | Row 6 | Row 5 | Row 4 | Row 3 | Row 2 | Row 1 | Row 0 | Row 7 |
| Tile 0 | Row 7 | Row 6 | Row 5 | Row 4 | Row 3 | Row 2 | Row 1 | Row 0 |
| | Row 7 | Row 6 | Row 5 | Row 4 | Row 3 | Row 2 | Row 1 | Row 0 |
| | Row 7 | Row 6 | Row 5 | Row 4 | Row 3 | Row 2 | Row 1 | Row 0 |
| | Row 7 | Row 6 | Row 5 | Row 4 | Row 3 | Row 2 | Row 1 | Row 0 |

FIGURE 3

| Row | Strip 0 | Strip 1 | Strip 2 | Strip 3 | Strip 4 | Strip 5 | Strip 6 | Strip 7 |
|---|---|---|---|---|---|---|---|---|
| 0 | 000 | 001 | 010 | 011 | 100 | 101 | 110 | 111 |
| 1 | 111 | 000 | 001 | 010 | 011 | 100 | 101 | 110 |
| 2 | 110 | 111 | 000 | 001 | 010 | 011 | 100 | 101 |
| 3 | 101 | 110 | 111 | 000 | 001 | 010 | 011 | 100 |
| 4 | 100 | 101 | 110 | 111 | 000 | 001 | 010 | 011 |
| 5 | 011 | 100 | 101 | 110 | 111 | 000 | 001 | 010 |
| 6 | 010 | 011 | 100 | 101 | 110 | 111 | 000 | 001 |
| 7 | 001 | 010 | 011 | 100 | 101 | 110 | 111 | 000 |

FIGURE 4

PLANAR BYTE MEMORY ORGANIZATION WITH LINEAR ACCESS

CROSS-REFERENCE TO OTHER APPLICATION

This application claims priority from 60/269,802, filed Feb. 20, 2001, which is hereby incorporated by reference.

BACKGROUND AND SUMMARY OF THE INVENTION

The present invention relates to graphics memory architectures, and particularly to architectures optimized for both video-driven and 3D-graphics-driven performance.

A standard graphics memory organization stores data for a scanline at sequential addresses. This is convenient for the display of data, which has to be accessed in scanline order, but is inefficient for drawing operations.

The performance of drawing often depends on maintaining locality of data. This may be due to caches or to the row/column organization of dynamic memories. Drawing operations rarely stay on the same scanline for long and generally move in Y as well as X. Organizing memory for efficient access only in the X dimension degrades overall performance.

Planar Byte Memory Organization with Linear Access

The present application discloses an improvement on a graphics memory architecture which is oriented in a tiled format. (In the preferred system example, memory is organized as 8 byte by 8 byte tiles that are stacked through memory; and data is accessed by tile number instead of by byte position.) The present application discloses an improvement wherein the memory controller can operate selectably, for each access, in two modes:

either providing parallel access to a single tile (which is more advantageous for many graphics applications), or providing parallel access to a scanline which extends across many tiles (which is more advantageous for many video applications).

Preferably this is achieved, in part, by an adjustment of row address locations and address connections.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 3 shows a way of permuting row orders, within successive tiles, which advantageously permits two modes of memory access; and FIG. 4 shows associated possible address sequences.

FIG. 1E shows the interface to the Memory Pipe Unit in this accelerator.

DETAILED DESCRIPTION OF THE PREFERRED EMBODIMENTS

The numerous innovative teachings of the present application will be described with particular reference to the presently preferred embodiment (by way of example, and not of limitation).

The present application discloses an improvement on a graphics memory architecture which is oriented in a tiled format. (In the preferred system example, memory is organized as 8 byte by 8 byte tiles that are stacked through memory; and data is accessed by tile number instead of by byte position.)

Figure 1:
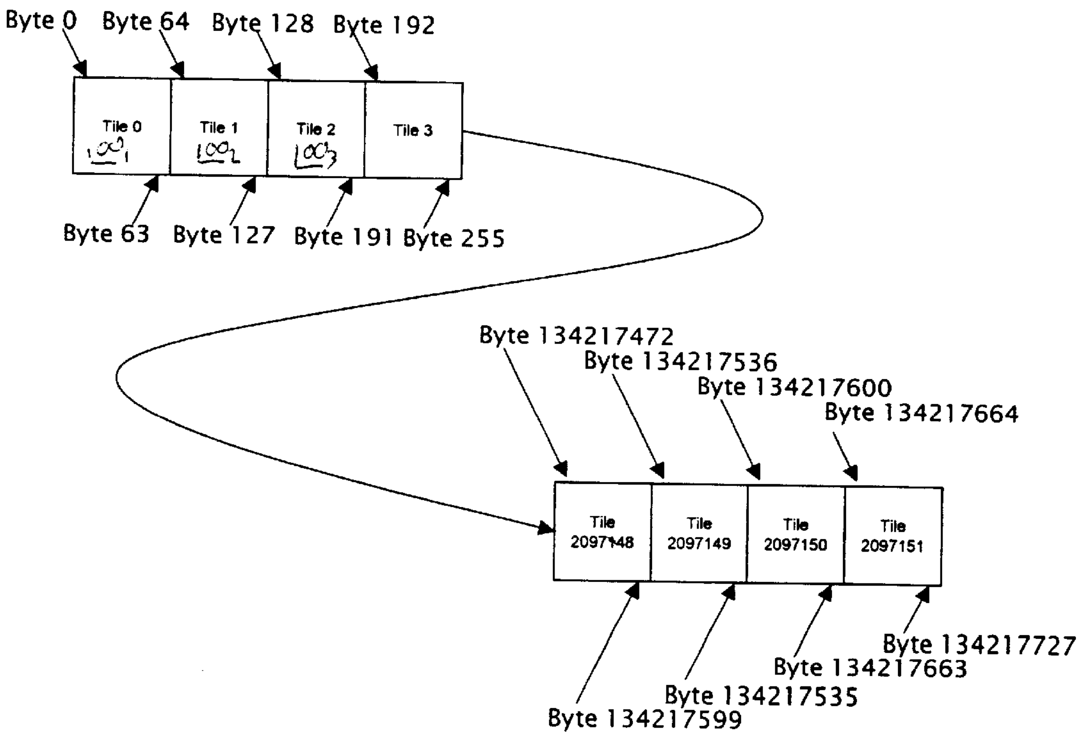
FIG. 1 shows how the memory system is preferably organized as tiles that are stacked through memory.

FIG. 1 shows how the memory system is preferably organized as 8 byte by 8 byte tiles 100 that are stacked through memory. Instead of addressing by byte position, data is accessed by tile number.

Figure 2:
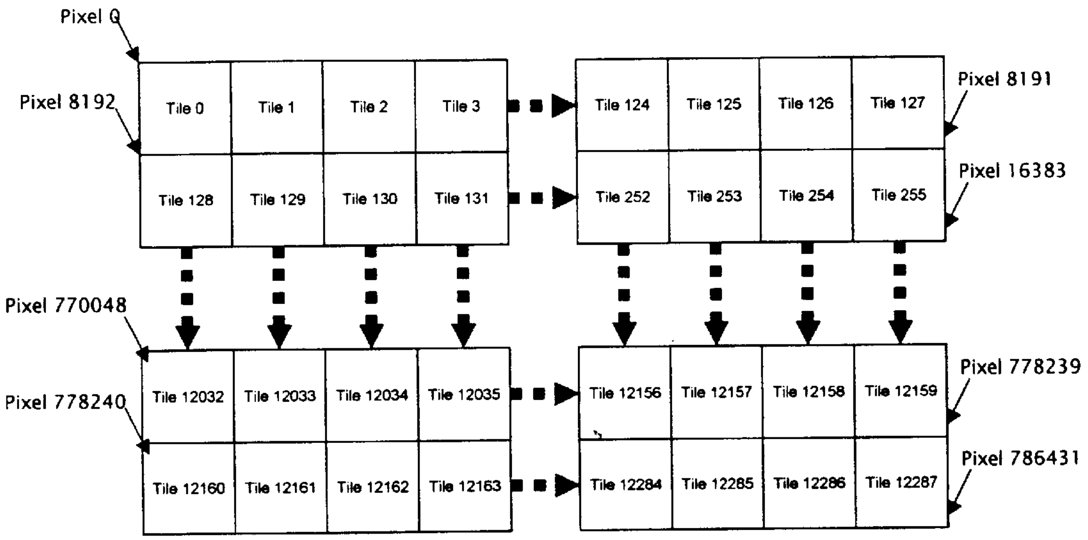
FIG. 2 shows an example of adjacent tile storage.

Normally, each tile corresponds to a region of a buffer (perhaps the framebuffer or a texture). If the data type held in the buffer needs more than one byte per entry, the bytes are preferably held in separate tiles. (Thus this organization may be described as a "byte planar" format. FIG. 2 shows a 1024×768 screen at 8 bits per pixel: if the pixel data is (for example) 24-bit RGB data, three complete sets of tiles, like the set of FIG. 2, would be needed for the three bytes of color.

Tile access is efficient for the graphics processor, but is inefficient for video processing. Video usually needs to work along a complete scanline before moving to the next. If this done using tiles, ⅞ of each tile is not needed until some time later. (If the tiles are larger, then an even larger fraction of bandwidth is wasted if only scanline access is needed.) To avoid wasting the bandwidth taken to read tile it becomes necessary to store the data somewhere, probably in on-chip storage capable of holding 7 scanlines. which represents a considerable cost.

FIG. 3 shows a way of permuting row orders, within successive tiles of a block of 8, which permits the two modes of memory access. This allows two different views of the memory, one as tiled the other as linear. There is a pin cost to this, but the wasted video bandwidth is kept to a minimum which leaves the maximum possible to the graphics controller.

FIG. 3 shows how the preferred physical organization of tiled data in memory makes it possible to view different tiles at the same time. The diagram shows the distribution of tiles in a 128 bit wide memory system, and shows how row 0 from different tiles can be accessed at the same time if the data is rotated in a suitable way.

Successive tiles in a bank are rotated by 16 bits. By supplying a different address to each 16 bit strip a single row can be read without any redundant data.

In a further refinement, the present inventors have realized that it is not necessary to supply a complete address to each 16 bit strip. In the presently preferred embodiment (with 8×8 tiles), only 3 bits need to be unique, and it is possible to reduce this further by noting the fixed relationship between the addresses formed.

FIG. 4 shows possible address sequences. Note that strip 0 and strip 2 always have the same LSB so they can be shared, as can those of strip 1 and strip 3. The next address bits can also be shared.

Figure 5:
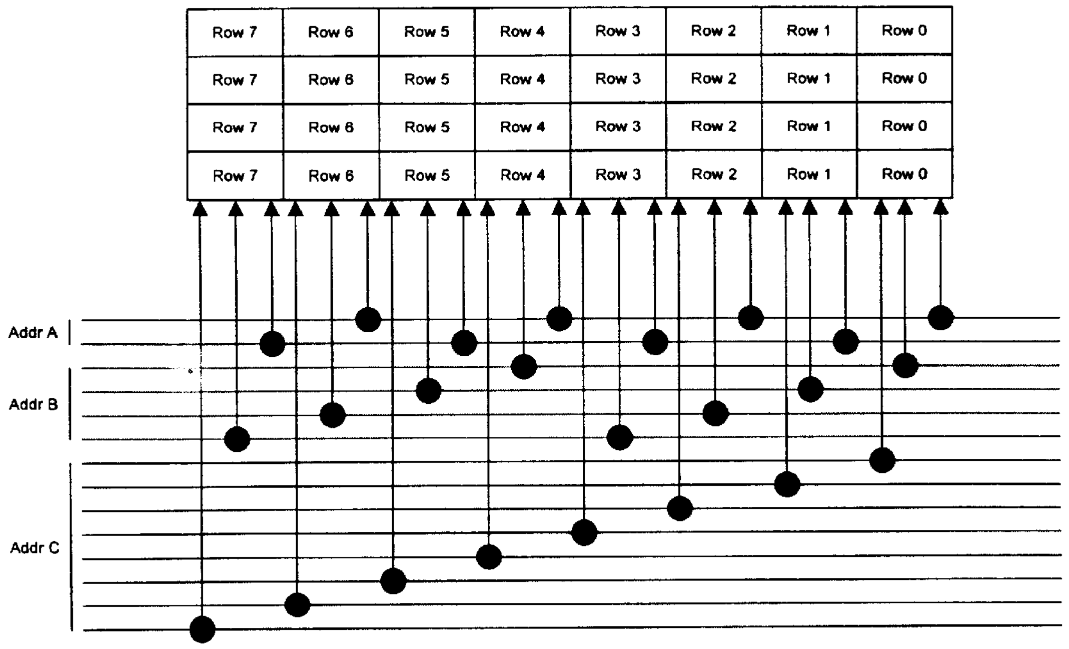
FIG. 5 shows possible wiring of the addresses, in connection with the assignments shown in FIG. 3, to economize on address bits.

FIG. 5 shows possible wiring of the addresses. Because of this sharing, only two lines are needed for address component A, and only 4 for address component B. Thus the total number of address bits, in this example, is 2+4+8=14. Thus only 11 extra pins are needed.

The foregoing example has been described for 8×8 tiles and 128-bit-wide access, but similar techniques are also applicable to different memory widths (e.g. 64 bits instead of 128 bits) or different types of memory device (e.g. 32 bits wide instead of 16 bits wide).

Preferred System Implementation

The claimed inventions have been implemented in the context of a new graphics subsystem which is referred to herein as the "P10." That subsystem will now be described at some length, but it must be understood that many of the features of the P10 subsystem are not required for use of the claimed inventions, and should not be understood as implicit claim limitations.

The P10 rasterizer represents a brand new architecture, designed from the ground up. It is a clean sheet design, but draws on the many lessons learnt during the life time of the previous generation of rasterizer chips forming the GLINT and Permedia product lines. A number of events, or discontinuities, have made it imperative to change architectures:

Performance. Previous rasteriser chips have only processed one fragment at a time throughout the pipeline and successive generations have reduced the number of cycles (really messages) taken to do the processing. This has been reduced to one cycle and the logical step is to now process multiple fragments per cycle. This could be done by replicating the cores, but this will lead to a very inefficient design.

Existing rasterisers are fixed function devices. With the advent of multi texturing it has become impossible to cast sufficiently flexibility into a fixed function device, particularly when up to 8 textures can be combined in one fragment. Microsoft have recognized this in DX8 and are pushing programmable shading languages as the way forward. Clearly the 3D chip community have no choice by to go along with this.

The size and complexity of the chips has been growing at an alarming rate thereby pushing out the design, implementation, testing and layout times. Some of these can be helped at the architectural level by using more, but simpler, blocks in parallel and re-evaluating what the important feature set is (to eliminate some of the historical baggage).

The P10 architecture is a hybrid design employing fixed function units where the operations are very well defined and programmable units where flexibility is needed.

Performance

The architecture has been designed to allow a range of performance trade-offs to be made and the first instantiated version will lie somewhere in the middle of the performance landscape. One aspect of the performance, which may at first sight, seem like a backwards step is that the performance will vary depending on the set of modes in operation. The earlier architectures strived (and achieved it in the end) that for a given memory bandwidth demand turning on features did not effect performance. This will no longer always be true, partly due to the programmable nature of some of the units, but also because it is not effective to carry that much hardware to process, say, 8 fragments when some little used mode is turned on. How much performance drops when a mode is turned on is hard to quantify as it depends so much on the combination of modes already enabled. For example, turning on logical ops while alpha blending may drop performance from 8 fragments per cycle to 5 fragments per cycle, but if texture mapping was enabled (which runs at 4 or fewer fragments per cycle) then there would be no drop in performance.

Basic Feature Set

The P10 includes all of the normal feature set which earlier devices have had, plus:

- Up to 8 textures per fragment with any combination of trilinear, 3D, anisotropic filtering, bump mapping or cube mapping.
- True floating point coordinate generation.
- Programmable texture coordinate generation.
- Programmable shading unit (i.e. texture combiner).
- Programmable pixel unit.
- Accumulation buffering and convolution.
- T buffer full scene antialiasing.
- Integrated Geometry and Lighting.

A First Look

The basic (and only) unit of work the rasteriser works in internally is a tile. All primitives, 2D and 3D, are broken down into tiles for processing. A tile is an 8×8 square of pixels and is always screen aligned on 8 pixel boundaries. This should not be confused with region/tile/chunking architectures which require the input primitives to be sorted into tiles and then processed collectively. This style of architecture certainly has some benefits, but doesn't fit very well with current APIs and high triangle counts.

The motivation for this approach are:

- The more data the memory controller can read or write per request the more efficient it will be able to run. Needless to say you should strive to make use of all the data in the transfer and not some small fraction of it. Tiles are also visited in an order aimed at promoting optimum memory usage, although the Memory Controller can hid the page break cost in all transfers larger than one (byte wide) tile. More extensive caching techniques are used to smooth out demand peaks and to allow some degree of pre-fetching to occur.
- Earlier architectures used a 64×1 tile (called a span) to great effect for (mainly) 2D operations. Making the span a square tile increases its usefulness for 3D, and reduces the inefficiency for small 2D operations (e.g. character).
- Texture performance depends totally on good cache behavior, and this basically means making use of coherency between scanlines. With regular scanline rendering the size of the cache needs to be quite large to do this effectively as it may be may hundreds of pixels later you finally reach a point on the next scanline where you get to reuse the texture data cached for the corresponding pixel on the previous scanline. By working in tiles you can exploit the coherence in Y with a very modest cache size.
- A tile provides a convenient package of work which can be processed in an appropriate number of cycles depending on the performance and gate trade-offs. This should allow the same basic architecture to cover several generations.

Isochronous Operation

Isochronous operation is where some type of rendering is scheduled to occur at a specific time (such as during frame blank) and has to be done then irrespective of what ever other rendering may be in progress. GDI+ is introducing this notion to the Windows platform. The two solutions to this are to have an independent unit to do this so the main graphics core doesn't see these isochronous commands or to allow the graphics core to respond to preemptive multitasking.

The first solution sounds the simplest and easiest to implement, and probably is if the isochronous stream were limited to simple blits, however the functionality doesn't have to grow very much before this side unit starts to look more and more like a full graphics core.

The second solution is future proof and may well be more gate efficient as it reuses resources already needed for other things. However it requires an efficient way to context switch, preferably without any host intervention, and a way to suspend the rasteriser in the middle of a primitive.

Fast context switching can be achieved by duplicating registers and using a bit per Tile message is indicate which context should be used, or a command to switch sets. This is the fastest method but duplicating all the registers (and LUTs) will be very expensive and subsetting them may not be very future proof if a register is missed out which turns out to be needed.

The current context mechanism could be extended so the reading and writing of context data could be handled automatically by new units at the front and back of the message stream (to take over the software instigated DMAs) and use the local memory to hold the context record. Or . . .

As any context switchable state flows through into the rasteriser part it goes through is the Context Unit. This unit caches all context data and maintains a copy in the local memory. A small cache is needed so that frequently updating values such as mode registers do not cause a significant amount of memory traffic. When a context switch is needed the cache is flushed and the new context record read from memory and converted into a message stream to update downstream units. The message tags will be allocated to allow simple decode and mapping into the context record for both narrow and wide messages. Some special cases on capturing the context as well as restoring it will be needed to look after the cases where multiple words are mapped to the same tag, for example as used when program loading. One of the side effects of this is to be able to remove the context logic in each unit and the readback mechanisms (you could just read directly from context record in memory). Also the previous context mechanisms are problematic in the texture pipes (because the message stream doesn't run through the pipes) and this solution handles this transparently. This will be very fast as changing context will only require a small amount of state to be save (from the cache) and the restore will be at 1 message per cycle (even for wide messages). By allowing wide message loading of the LUTs, WCS, etc. the context restore could probably be reduced to 500 cycles or 3 microseconds.

Context switching the rasteriser part way through a primitive is avoided by having a second rasteriser dedicated to the isochronous stream. This second rasteriser is limited to just rectangles as this fulfills all the anticipated uses of the isochronous stream.

There are some special cases where intermediate values (such as the plane equations) will need to be regenerated and extra messages will be sent following a context switch to force these to occur. Internal state which is incremented such as glyph position and line stipple position needs to be handled separately.

The context for the units prior to the Context Unit is still saved by the Context Unit, but restored via the command units.

Memory Bandwidth

Given that an 8 fragment per cycle rasteriser is going to be severely memory bandwidth limited is there any point in considering such a thing? There are several reasons why it still is:

It prepares the architecture for the day when embedded DRAM can be used, but doesn't necessarily have to add to the gate cost.

Some pixel operations will exit early (depth test, scissor, etc.) and the bandwidth demand for these is a lot less. For example if the depth test fails then only 4 bytes per fragment will have been read thus needing only 9.6 GB/s. With increasing amounts of depth complexity in games and models rejecting fragments early is a big win. Similarly a lot of 2D operations will only write to the framebuffer and there is enough bandwidth to accommodate these at 14 fragments per cycle (for 32 bit pixels).

BRIEF DESCRIPTION

Figure 1A:
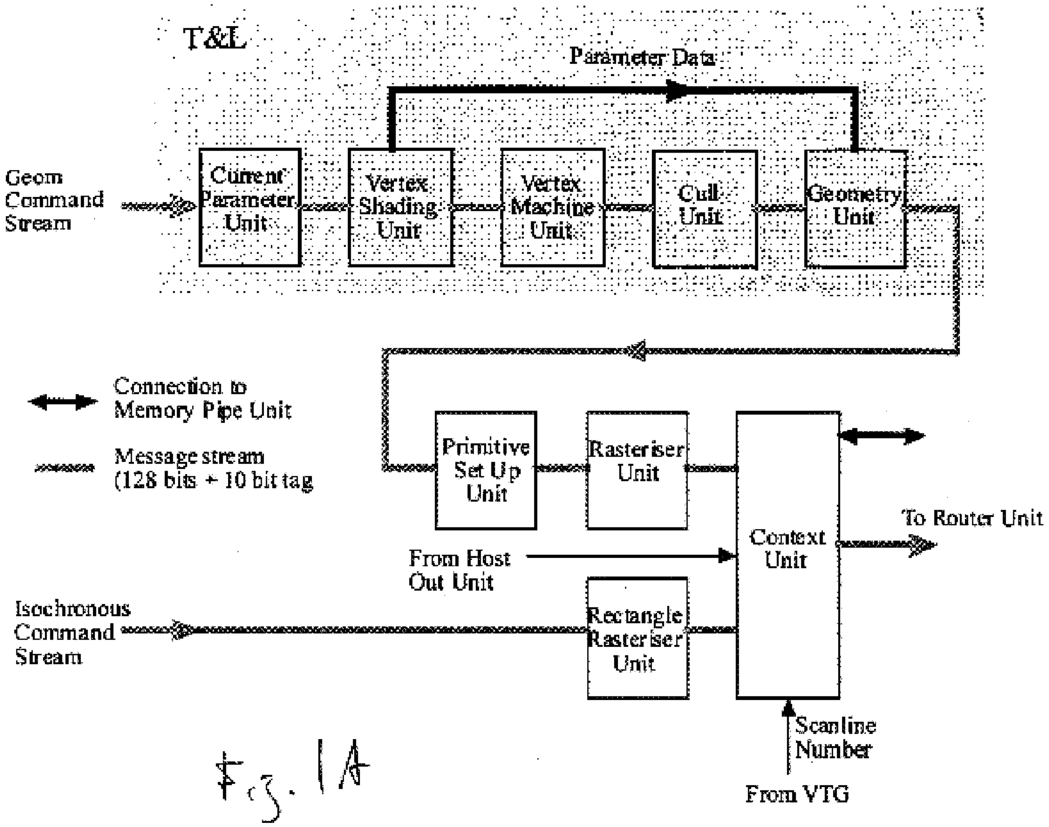
FIGS. 1A and 1B, in combination, show a block diagram of the core of a graphics accelerator which includes many innovations.
Figure 1B:
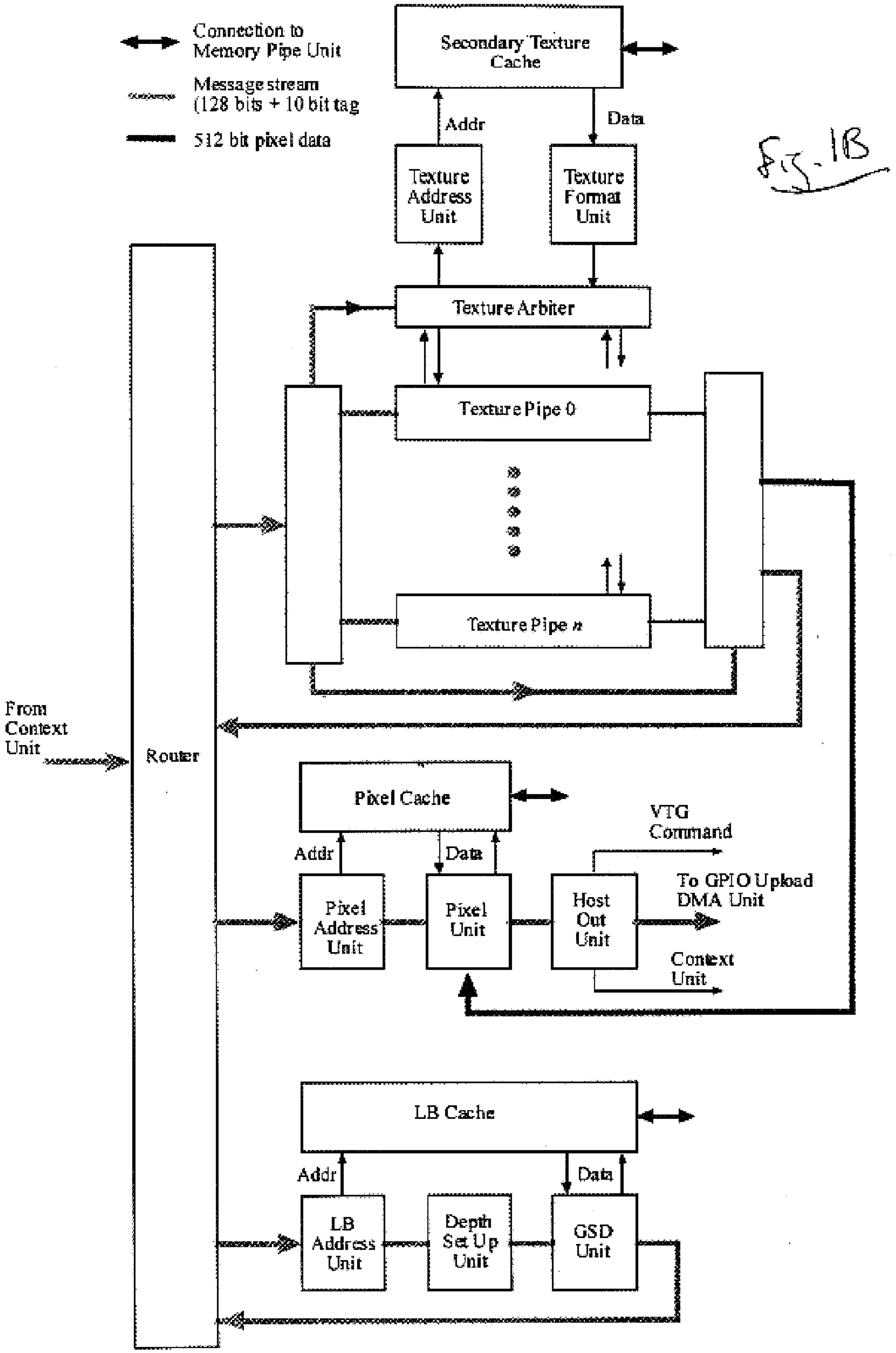

FIGS. 1A and 1B, in combination, show a block diagram of the core of P10. Four texture pipes have been assumed and match up the general performance figures given above, but this can be varied.

Some observations contrasting this architecture to earlier ones of 3Dlabs:

The message stream does not visit every unit.

- Trying to route a linear message stream though the texture pipes is fairly problematic, although fanning it out like in Gamma 3 would have been an option.
- It turns out that the texture units in the texture pipe have little or no state or any need for the color and coordinate information, but are heavily pipelined or have deep latency FIFOs. Not forcing the message stream to be routed through them saves on pipeline register and FIFO widths.
- The only down side is in testing as the interfaces are not so uniform across units.

The message stream does not carry any pixel data except for upload/download data and fragment coverage data.

- The private data paths give more bandwidth and can be tailored to the specific needs of the sending and receiving units.
- The private data path between the Shading Unit (via the Texture Mux Unit) and Pixel Unit doesn't need to go through the Router, or any other unit. If the message stream were increased in width to give the required bandwidth then the cost would be borne in a number of places. It will be necessary to have it FIFO buffered, particularly when the Router places the texture sub system first so that texture processing is not stalled while waiting for the Pixel Unit to use its data, but this cannot happen until the Tile message has reached it. Having one FIFO doing this buffering will be a lot cheaper than a distributed one and will ease chip layout routing.
- The message stream is still the only mechanism for loading registers and synchronizing internal operations.

Command Input

There are two independent Command Units—one servicing the GP stream (for 3D and general 2D commands) and one servicing the Isochronous stream. The isochronous command unit has less functionality as it doesn't need to support vertex arrays, for example.

The Command Unit performs the following distinct operations:

Input DMA

The command stream is fetched from memory (host or local as determined by the page tables) and broken into messages based on the tag format. The message data is padded out to 128 bits, if necessary, with zeros, except for the last 32 bits which is set to floating point 1.01. The DMA requests can be queued up in a command FIFO or can be embedded into the DMA buffer itself, thereby allowing hierarchical DMA (to two levels). The hierarchical DMA is useful to pre-assemble common command or message sequences or programs for rapid loading.

Circular Buffers

The circular buffers provide a mechanism whereby P10 can be given work in very small packets without incurring the cost of an escape call to the OS. These escape calls are relatively expensive so work is normally packaged up into large amounts before being given to the graphics system. This can result in the graphics system being idle while work has accumulated in the DMA buffer, but not enough to cause it to be dispatched, to the obvious detriment of performance. The circular buffers are preferably stored in local memory and mapped into the ICD and chip resident write pointer registers are updated when work has been added to the circular buffers (this doesn't require any OS intervention). When a circular buffer goes empty the hardware will automatically search the pool of circular buffers for more work and instigate a context switch if necessary.

There are 16 circular buffers and the command stream is processed in an identical way to input DMA, including the ability to 'call' DMA buffers.

Vertex Arrays

Vertex arrays are a more compact way of holding vertex data and allow a lot of flexibility on how the data is laid out in memory. Each element in the array can hold up to 16 parameters and each parameter can be from one to 4 floats in size (a packed and planar 32 bit formats are also available). The parameters can be held consecutively in memory or held in their own arrays. The vertex elements can be accessed sequentially or via one or two index arrays.

Vertex Cache Control for Indexed Arrays

When vertex array elements are accessed via index arrays and the arrays hold lists of independent primitives (lines, triangles or quads) then frequently the vertices are meshed in some way which can be discovered by comparing the indices for the current primitive against a recent history of indices. If a match is found then the vertex does not need to be fetched from memory (or indeed processed again in the Vertex Shading Unit), thus saving the memory bandwidth and processing costs. The 16 most recent indices are held.

Output DMA

The output DMA is mainly used to load data from the core into host memory. Typical uses of this is for image upload and returning current vertex state. The output DMA is initiated via messages which pass through the core and arrive via the Host Out Unit. This allows any number of output DMA requests to be queued.

Transform and Lighting

Figure 1C:
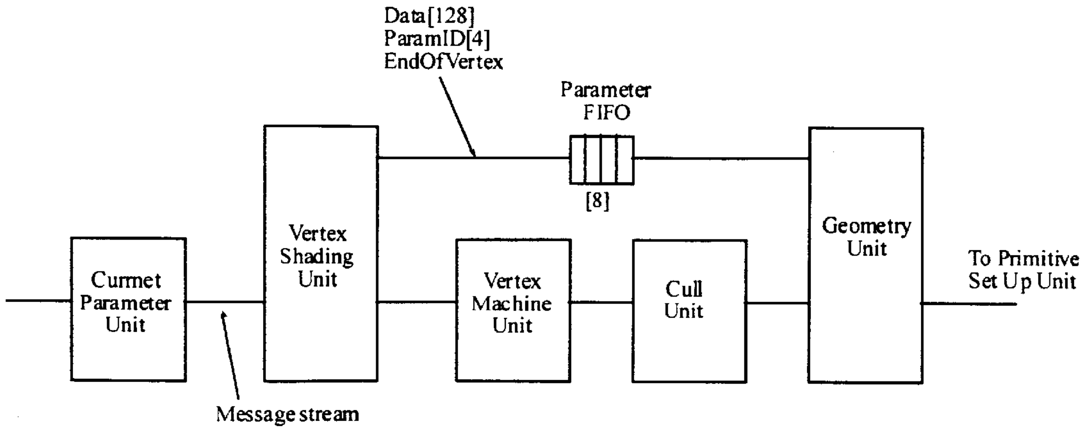
FIG. 1C shows the transform and lighting subsystem of this accelerator.

The transform and lighting subsystem consists of the following units, as shown in FIG. 1C:

Current Parameter Unit

Vertex Shading Unit

Vertex Machine Unit

Cull Unit

Geometry Unit

The Current Parameter Unit's main task it to allow a parameter such as a color or a texture to be supplied for every vertex even when it is not included in a DMA buffer. This allows vertices in OpenGL to inherit previously defined parameters without being forced to supply them on every vertex. Vertex arrays and vertex buffers always supply the same set of predefined parameters per vertex. Always supplying 16 sets of parameters on every vertex will reducing performance considerably so the Current Parameter Unit tracks how many times a parameter is forwarded on and stops appending any missing parameters to a vertex once it knows the Vertex Shading Unit has copies in all its input buffers.

The Vertex Shading Unit is where the transformations, lighting and texture coordinate generation are done. These are accomplished with user defined programs. The programs can be 256 instructions long and subroutines and loops are supported. The matrices, lighting parameters, etc. are held in a 256 Vec4 Coefficient memory and intermediate results are held in 64 Float registers. The vertex input consists of 16 Vec4s and are typeless. The 17 Vec4 output vertex results are typed as the rest of the system needs to know what results are coordinates, colors or texture coordinates.

Vertices are entered into the double buffered input buffers in round robin fashion. When 16 input vertices have been received or an attempt is made to update the program or coefficient memories the program is run. Non unit messages do not usually cause the program to run, but they are correctly interleaved with the vertex results on output to maintain temporal ordering.

The Vertex Shading Unit is implemented as a 16 element SIMD array, with each element (VP) working on a separate vertex. The floating point ALU in each VP is a scalar multiplier accumulator which also supports multi cycle vector instructions.

The coordinate results are passed to the Vertex Machine Unit via the message stream and the 16 parameter results directly to the Geometry Unit on a private bus. The two output ports allow for a higher vertex throughput.

The Vertex Machine Unit monitors vertex coordinates (really window coordinates now) as they pass through. When enough vertices for the given primitive type have passed through a GeomPoint, GeomLine or GeomTriangle message is issued. Keeping the orientation of triangles constant, which vertex is a provoking vertex, when to reset the line stipple, etc. are all handled here. The Vertex Machine will use all 16 vertex cache entries (even though for many of the primitives it is not possible to extract any more than the inherent cache locality) as this greatly reduces the chance of loading a scoreboarded parameter registers stalling.

The Cull Unit caches the window coordinates for the 16 vertices and when a Geom* message arrives will use the cached window coordinates to test clip against the viewing frustrum and, for triangles, do a back face test. Any primitives failing these tests (if enabled) will be discarded. Any primitives passing these tests are passed on, however if the clip test is inconclusive the primitive is further tested against the guard band limits. A pass against these new limits means that it will be left to the rasteriser to clip the primitive while it is being filled—it can do this very efficiency and spends very little time in 'out of view' regions. A fail against the guard band limits or the near, far or user clip plane will cause the primitive to be geometrically clipped in the Geometry Unit.

The Geometry Unit holds the full vertex cache for 16 vertices. Each entry holds 16 parameters and a window coordinate and as each primitive is processed it checks that the necessary vertex data is present (it tracks what the destination circular buffers are done) in the down stream set up units and if not will supply them. This is done lazily to minimize message traffic. The Geometry Unit can accept vertex data faster than can be passed on to the rasteriser and filters out vertex data for culled primitives. This allows for a faster cull rate than rendering rate.

Primitives which need to be geometrically clipped are done in the Geometry Unit. This is done by calculating the barycentric coordinates for the vertices in the clip polygon using the Sutherland Hodgman clipping algorithm. The clip polygon is rendered as a series of triangles.

Context Unit

The isochronous stream and the main stream join into a common stream at the Context Unit. The Context Unit will arbitrate between both input streams and dynamically switch between them. This switching to the isochronous stream normally occurs when the display reaches a range of scanlines. Before the other stream can take over the context of the current stream must be saved and the context for the new stream restored. This is done automatically by the Context Unit without any host involvement and, in the presently preferred embodiment, takes less than 3 microseconds.

As state or programs for the downstream units pass through the Context Unit it snoops the messages and write the data to memory. In order to reduce the memory bandwidth the context data is staged via a small cache. The allocation of tags has been done carefully so messages with differing widths are grouped together and segregated from transient data. High frequency transient data such as vertex parameters are not contexted switched as any isochronous rendering will set up the plane equations directly rather than via vertex values. The Context Unit will only switch the context of units downstream from it. A full context switch (as may be required when changing from one application to another) is initiated by the driver using the ChangeContext message. The upstream units from the Context Unit (on the T&L side) will then dump their context out, often using the same messages which loaded it in the first place, which the Context Unit will intercept and write out to memory. The Command Unit will fetch the context data for the upstream units (loaded using their normal tags) while the Context Unit will handle the downstream units. A full context switch is expected to take less than 20 microseconds.

The isochronous stream has it's own rasteriser. This rasteriser can only scan convert rectangles and is considerably simpler and smaller than the main rasteriser. Using a second rasteriser avoids the need to context switch the main rasteriser part way through a primitive which is very desirable as it is heavily pipelined with lots of internal state.

The Context Unit can also be used as a conduit for parameter data to be written directly to memory. This allows the results of one program to be fed back into a second program and can be used, for example, for surface tessellation.

Primitive Set Up Sub System

This subsystem is made up from:

Primitive Set Up Unit

Depth Set Up Unit

Parameter Set Up Unit(s)

Input to this subsystem is the coordinates, colors, texture coordinates, etc. per vertex and these are stored local vertex stores. The vertex stores are distributed so each Set Up Unit only holds the parameters it is concerned with.

The Primitive Unit does any primitive specific processing. This includes calculating the area of triangles, splitting stippled lines (aliased and antialiased) into individual line segments, converting lines into quads for rasterisation and converting points into screen aligned squares for rasterisation. Window relative coordinates are converted into fixed point screen relative coordinates. Finally it calculates the projected x and y gradients from the floating point coordinates (used when calculating the parameter gradients) for all primitives.

The Depth Set Up Unit and the Parameter Set Up Unit are very similar with the differences being constrained to the parameter tag values, input clamping requirements and output format conversion. The Depth Set Up Unit has a 16 entry direct mapped vertex store. The common part is a plane equation evaluator which implements 3 equations—one for the gradient in x, one for the gradient in y and one for the start value. These equations are common for all primitive types and are applied once per parameter per primitive. The set up units are adjacent to their corresponding units which will evaluate the parameter value over the primitive.

The Parameter Set Up Unit is replicated in each texture pipe so only does the set up for primitives which reach that pipe. The parameters handled by this unit are 8 four component color values and 8 four component texture values. For small primitives the performance of the 4 Parameter Set Up Units will balance the single Depth Set Up Unit. The vertex store in this unit is arranged as a circular buffer which can hold 48 parameters. This is considerably smaller than the 256 parameter store required to hold 16 parameters for 16 vertices. In most cases there will only be a few parameters per vertex so we get the benefit of being able to hold 16 vertices, but as the number of parameters per vertex increased then the total number of vertices which can be held will reduce. In the limit we can still hold all 16 parameters for three vertices which is the minimum number of vertices necessary to set up the plane equations. Color parameters can be marked as being 'flat' when flat shading is enabled.

The Depth Set Up Unit does the set up for every primitive but it only has to set up one parameter. In addition to this it determines the minimum or maximum depth value of the primitive (called zref) to be used in the rapid rejection of tiles (see later) and calculates the polygon offset if needed.

All parameter calculations are done by evaluating the plane equation directly rather than using DDAs. This allows the tiles all primitives are decomposed into to be visited in any order and evaluation for fragment positions within a tile to be done in parallel (when needed). The origin of the plane equation is relocated from (0, 0) to the upper left fragment of a tile which overlaps the primitive so constrain the dynamic range of the c value in the plane equation.

The set up processing is split across multiple units rather than concentrating it in a single unit (the Delta Unit in earlier chips) because:

The Delta Unit had got very large and complex and was in dire need of some rationalization and simplification. Splitting the operation up, especially as two of the units are very similar has achieved this.

Performance and gate efficiency. Previous increases in set up performance had been achieved by replicating the whole Delta Unit—a pragmatic rather than elegant solution. These multiple units will work in parallel thereby giving a performance gain.

Reduces the set up message overheads. Previously the Rasteriser Unit would see the DDA messages for every parameter and while making the messages wider and using a bypass FIFO (in the Rasteriser Unit) reduced the overhead it could not eliminate it. Some overhead will always be present with a message stream based architecture, but this has now been reduced to the absolute minimum.

Rasteriser Sub System

The Rasteriser subsystem consists of a Rasteriser Unit and a Rectangle Rasteriser Unit.

The Rectangle Rasteriser Unit, as the name suggests, will only rasterize rectangles and is located in the isochronous stream. The rasterisation direction can be specified.

The remaining discussion in this section will only apply to the main Rasteriser Unit which handles all the non isochronous rasterisation tasks.

The input to the Rasteriser Unit is in fixed point 2's complement 14.4 fixed point coordinates. When a Draw* command is received the unit will then calculate the 3 or 4 edge functions for the primitive type, identify which edges are inclusive edges (i.e. should return inside if a sample point lies exactly on the edge) and identify the start tile. Once the edges of the primitive and a start tile is known the rasteriser seeks out tiles which are inside the edges or intersect the edges. This seeking is further qualified by a user defined visible rectangle (VisRect) to prevent the rasteriser visiting tiles outside of the screen/window/viewport. Tiles which pass this stage will be either totally inside or partially inside the primitive. Tiles which are partially inside are further tested to determine which fragments in the tile are inside the primitive and a tile mask built up.

The output of the rasteriser is the Tile message which controls the rest of the core. Each tile message holds the tile's coordinate and tile mask. The tiles are always screen relative and are aligned to tile (8×8 pixel) boundaries. Before a Tile message is sent it is optionally scissored and masked using the area stipple pattern. The rasteriser will generate tiles in an order that maximizes memory bandwidth by staying in page as much as is possible. Memory is organized in 8×8 tiles and these are stored linearly in memory.

The rasteriser has an input coordinate range of ±8K, but after visible rectangle clipping this is reduced to 0 . . . 8K. This can be communicated to the other units in 10 bit fields for x and y as the bottom 3 bits can be omitted (they are always 0). Destination tiles are always aligned as indicated above, but source tiles can have any alignment. The Pixel Address Unit will use a local 2D offset to generate non aligned tiles, but convert these into 1, 2 or 4 aligned tile reads to memory, merge the results and pass on to the Pixel Unit for processing.

The triangle, antialiased triangles, lines, antialiased lines, points and 3D rectangles are all rasterised with basically the same algorithm, however antialiased points and 2D rectangles are treated as special cases.

The Rectangle2D primitive is limited to rasterising screen aligned rectangles but will rasterise tiles in one of four orders (left to right, right to left, top to bottom, bottom to top) so overlapping blit regions can be implemented. The rasterisation of the rectangle is further qualified by an operation field so a rectangle can sync on host data (for image download), or sync on bit masks (for monochrome expansion or glyph handling) in which case the tiles are output in linear scanline order. Each tile will be visited multiple times, but with one row of fragments selected so that the host can present data in scanline order without any regard to the tile structure of the framebuffer. The packed host data is unpacked and aligned and sent to the Pixel Unit before the Tile message. The host bitmask is aligned to the tile and row position and then forwarded to the Pixel Unit as a PixelMask message before the Tile message where it can be tested and used. Alternatively the bitmask can be anded with the Tile mask. For image upload the tiles can also be visited in scanline order.

The Rasteriser Unit handles arbitrary quad and triangle rasterisation, antialias subpixel mask and coverage calculation, scissor operations and area stippling. The rasterisation process can be broken down into three parts:

- Calculate the bounding box of the primitive and test this against the VisRect. The VisRect defines the only pixels which are allowed to be touched. In a dual P10 system each P10 is assigned alternating super tiles (64×64 pixels) in a checker board pattern. If the bounding box of the primitive is contained in the other P10's super tile the primitive is discarded at this stage.
- Visiting the tiles which are interior to, or on the edge of a primitive while spending no time visiting tiles outside the primitive or in clipped out regions of the primitive which fall outside of the VisRect. Extra sample points outside of the current tile being processed are used as 'out riggers' to assist in this. One other area where care is needed is on thin slivers of primitives which fall between sample points and give a zero tile mask, thereby giving the impression the edge of a primitive has been found.
- Computing the tile mask to show which fragments in the tile are inside the primitive. This also extends to calculating the coverage mask for antialiasing.

There are 4 edge function generators so that arbitrary quads can be supported, although these will normally be screen aligned parallelograms or non screen aligned rectangles for aliased lines or antialiased lines respectively. Screen aligned rectangles will be used for 2D and 3D points. Triangles only need to use 3 edge function generators.

The edge functions will test which side of an edge the 64 sample positions in a tile lay and return an inside mask. ANDing together the 3 or 4 inside masks will give a tile mask with the inside fragments of the primitive for this tile set. Sample points which lie exactly on an edge need to be handled carefully so shared edges only touch a sample point once.

The sample points are normally positioned at the center of the pixels, but when antialiasing up to 16 sample points are configured to lie within a pixel. The 16 subpixel sample points are irregularly positioned (via a user programmable table) on a regular 8×8 grid within the pixel so that any edge moving across a pixel will cover (or uncover) the sample points gradually and not 4 at a time. This emulates stochastic (or jittered) sampling and gives better antialiasing results as, in general, more intensity levels are used.

Antialiasing is done by jittering the tile's position and generating a new tile mask. The jittered tile masks are then accumulated to calculate a coverage value or coverage mask for each fragment position. The number of times a tile is jittered can be varied to trade off antialiasing quality against speed. Tiles which are totally inside the primitive are automatically marked with 100% coverage so these are processed at non antialising speeds. This information is also passed to the Pixel Unit so it can implement a faster processing path for fully covered pixels.

The UserScissor rectangle will optionally modify the tile mask if the tile intersects the scissor rectangle or delete a Tile message if it is outside of the scissor rectangle. This, unlike the VisRect, does not influence which tiles are visited.

Finally the tile mask is optionally ANDed with the 8×8 area stipple mask extracted from the stipple mask table. The stipple mask held in the table is always 32×32 and screen aligned.

The rasteriser computes the tile mask in a single cycle and this may seem excessively fast (and hence expensive) when the remainder of the core is usually taking, say 4 . . . 8 cycles per tile. The reasons for this apparent mismatch are:

- To allow guard band clipping and scissoring to occur faster.
- Searching for interior tiles when the start tile is outside the primitive (maybe due to guard band clipping) is wasted processing time and should be minimized.
- To allow for some inefficiencies in tracking the primitive boundary where empty tiles outside the primitive are visited.

The antialiasing hardware uses the same 64 point sampler to calculate the subsamples values so could take up to 16 cycles to calculate each fragment's coverage.

It allows some simple operations to run much faster. Examples of this are clearing a buffer, GID testing and early exit depth testing.

Antialised points are processed in a different way as it is not possible to use the edge function generators without making them very expensive or converting the point to an polygon. The method used it to calculate the distance from each subpixel sample point in the point's bounding box to the point's center and compare this to the point's radius. Subpixel sample points with a distance greater than the radius do not contribute to a pixel's coverage. The cost of this is kept low by only allowing small radius points hence the distance calculation is a small multiply and by taking a cycle per subpixel sample per pixel within the bounding box. This will limit the performance on this primitive, however this is not a performance critical operation but does need to be supported as the software has no way to substitute alternative rendering commands due to polymode behavior.

Texture Sub System

The texture sub system is the largest and most complicated subsystem and will be further split up for this description.

The main components of the texture subsystem are:

Texture Switch Unit

One or more Texture Pipes

Texture Arbiter Unit

Texture Address Unit

Texture Format Unit

Secondary Texture Cache

Texture Mux Unit

The Texture Switch Unit provides the interface for all the texture unit (except the Parameter Unit and the Shading Unit) to the message stream. It will decode tags and, where necessary, cause the state in each the texture pipe to be updated.

A texture pipe does all the color and texture processing necessary for a single tile so the Texture Switch Unit distributes the Tile messages in round robin fashion to the active texture pipes. Distributing the work in this fashion probably takes more gates, but does have the following advantages:

It allows the design to be more scalable and not limited to a power of two number of pipes.

The performance is not quantized as much when the number of textures is not an exact multiple or fraction of the number of pipes. For example 3 textures would leave one pipe unused with the alternative scheme, whereas with this approach all pipes are kept at maximum throughput.

The number of texture pipes is transparent to the software and the Texture Switch Unit can avoid using texture pipes with manufacturing defects. Obviously this will reduce performance but it does allow a device which would have otherwise been scrapped to be recovered and sold into a market where the drop in texture performance is acceptable. This will improve the effective manufacturing yield.

The Texture Switch Unit is much simpler than would have been true with texture pipes working together with feedback from one pipe to the next.

Small primitive performance is improved because each pipe only sets up and processes the tiles (i.e. small primitives) given to it.

Each texture pipe works autonomously and will compute the filtered texture values for the valid fragments in the tile it has been given. It will do this for up to eight sets of textures and pass the results to the Shader Unit in the pipe, and potentially back to the Texture Coordinate Unit for bump mapping. Processing within the texture pipe is done as a mixture of SIMD units (Texture Coordinate Unit and Shading Unit) or one fragment at a time (Primary Texture Cache Unit and Texture Filter Unit) depending on how hard to parallelize the required operations.

Each texture in a pipe can be trilinear filtered with per pixel LOD, cube mapped, bump mapped, anisotropic filtered and access 1D, 2D, or 3D maps. The texture pipe will issue read requests to the Texture Arbiter when cache misses occur. The texture pipe will be expanded on later.

The Texture Arbiter collects texture read requests from the texture pipes, serializes them and forwards them onto the Texture Address Unit. When the texture data is returned, after any necessary formatting, this unit will then route it to the requesting pipe. Each pipe has pair of ports in each direction so that requests from different mip map levels can be grouped together. The arbitration between the texture pipes is done on a round robin basis.

The Texture Address Unit calculates the address in memory where the texel data resides. This operation is shared by all texture pipes (to saves gates by not duplicating it), and in any case it only needs to calculate addresses as fast as the memory/secondary cache can service them. The texture map to read is identified by a 3 bit texture ID, its coordinate (i, j, k), a map level and a cube face. This together with local registers allow a memory address to be calculated. This unit only works in logical addresses and the translation to physical addresses and handling any page faulting is done in the Memory Controller. The layout of texture data in cube maps and mip map chains is now fully specified algorithmically so just the base address needs to be provided. The maximum texture map size is 8K×8K and they do not have to be square or a power of two in size.

Once the logical address has been calculated it is passed on to the Secondary Texture Cache Unit. This unit will check if the texture tile is in the cache and if so will send the data to the Texture Format Unit. If the texture tile is not present then it will issue a request to the Memory Pipe Unit and when the data arrives update the cache and then forward the data on. The cache lines hold a 256 byte block of data and this would normally represent an 8×8 by 32 bpp tile, but could be some other format (8 or 16 bpp, YUV or compressed). The cache is 4 way set associative and holds 128 lines (i.e. for a total cache size of 32 Kbytes), although this may change once some simulations have been done. Cache coherence with the memory is not maintained and it is up to the programmer to invalidate the cache whenever textures in memory are edited. The Secondary Texture Cache capitalizes on the coherency between tiles or sub tiles when more than one texture is being accessed.

The primary texture cache in the texture pipes always holds the texture data as 32 bpp 4×4 tiles so when the Texture Format Unit receives the raw texture data from the Texture Secondary Cache Unit it needs to convert it into this format before passing it on to the Texture Arbiter Unit. As well as handling the normal 1, 2, 3 or 4 component textures held as 8, 16 or 32 bits it also does any YUV 422 conversions (to YUV 444) and expands the DX compressed texture formats. Indexed textures are not handled directly but are converted to one of the texture formats when they are downloaded. Border colors are converted to a memory access as the border color for a texture map is held in the memory location after the texture map.

The Texture Mux Unit collects the fragment data for each tile from the various texture pipes and the message stream and multiplexes them to restore temporal ordering before passing them onto the Pixel Unit or Router respectively.

Texture Pipes

A Texture Pipe comprises six units:

Parameter Set Up Unit

Texture Coordinate Unit

Texture Index Unit

Primary Texture Cache Unit

Texture Filter Unit

Shading Unit

Figure 1D:
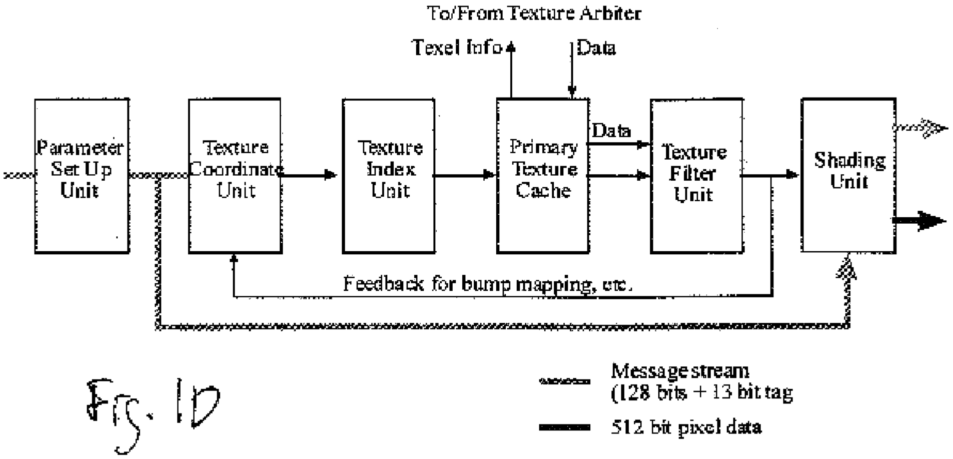
FIG. 1D shows the arrangement of the components of a Texture Pipe in this accelerator.
Figure 15:
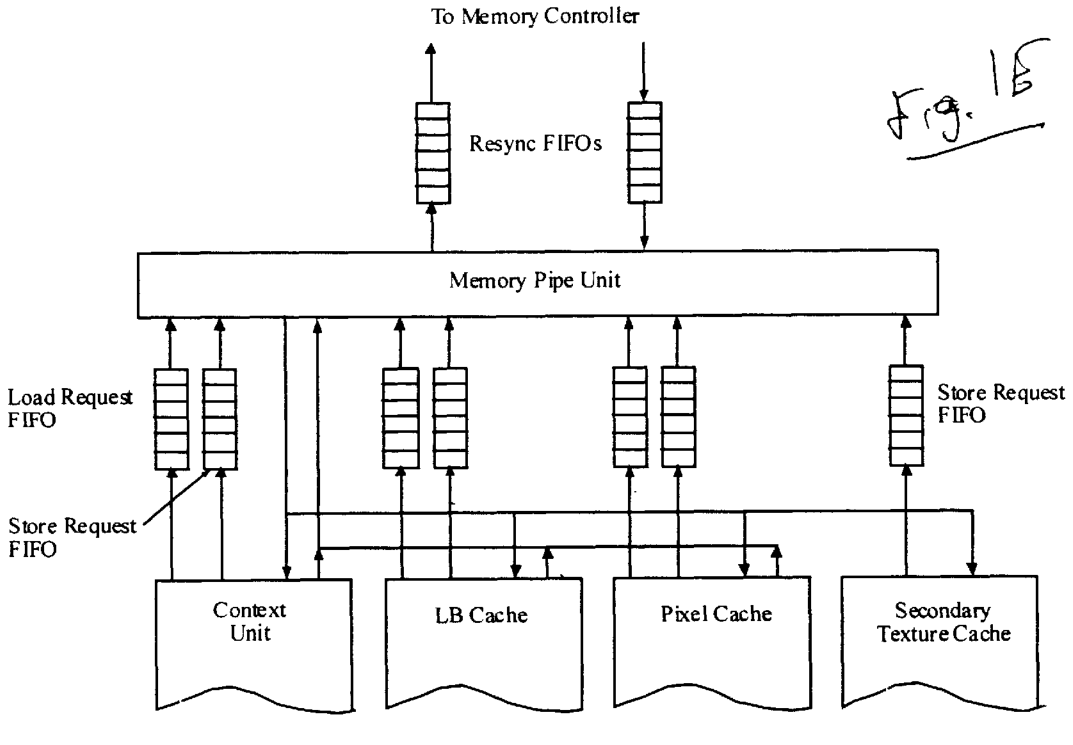

These are arranged as shown in FIG. 1D.

The Parameter Set Up Unit sets up the plane equations for the texture coordinates and color values used in the Texture Coordinate Unit and Shading Unit respectively. See earlier for details.

The Texture Coordinate Unit is a programmable SIMD array and calculates the texture coordinates and level of detail for all valid fragments within a tile. The SIMD array is likely to be 4×4 in size and the program run once per sub tile for those sub tiles with valid fragments. All the texture calculations for a sub tile are done before moving on to the next sub subtile.

Plane equation evaluation, cube mapping coordinate selection, bump mapping transformation and coordinate perturbation, 3D texture generation, perspective division and level of detail calculation are all done by the program. Anisotropic filtering loops through the program depending on the amount of filtering needed and the integration of the different filter samples in the Shading Unit is controlled from here. The final conversion to fixed point u, v, w coordinate includes an out of range test so the wrapping is all done in the Texture Index Unit.

The Texture Index Unit takes the u, v, w, lod and cube face information from the Texture Coordinate Unit and converts it in to the texture indices (i, j, k) and interpolation coefficients depending on the filter and wrapping modes in operation. Filtering across the edge of a cube map is handled by surrounding each face map with a border of texels taken from the butting face. Texture indices are adjusted if a border is present. The output of this unit is a record which identifies the 8 potential texels needed for the filtering, the associated interpolation coefficients, map levels and face number.

The Primary Texture Cache Unit uses the output record from the Texture Index Unit to look up in the cache directory if the required texels are already in the cache and if so where. Texels which are not in the cache are passed to the Texture Arbiter so they can be read from memory (or the secondary cache) and formatted. The read texture data passes through this unit on the way to the Texture Filter Unit (where the data part of the cache is held) so the expedited loading can be monitored and the fragment delayed if the texels it requires are not present in the cache. Expedited loading of the cache and FIFO buffering (between the cache lookup and dispatch operations) allows for the latency for a round trip to the secondary cache without any degradation in performance, however secondary cache misses will introduce stalls.

The primary cache is divided into two banks and each bank has 16 cache lines, each holding 16 texels in a 4×4 patch. The search is fully associative and 8 queries per cycle (4 in each bank) can be made. The replacement policy is LRU, but only on the set of cache lines not referenced by the current fragment or fragments in the latency FIFO. The banks are assigned so even mip map levels or 3D slices are in one bank while odd ones are in the other. The search key is based on the texel's index and texture ID not address in memory (saves having to compute 8 addresses). The cache coherency is only intended to work within a sub tile or maybe a tile and never between tiles.2

The Texture Filter Unit holds the data part of the primary texture cache in two banks and implements a trilinear lerp between the 8 texels simultaneously read from the cache. The texel data is always in 32 bit color format and there is no conversion or processing between the cache output and lerp tree. The lerp tree is configured between the different filter types (nearest, linear, 1D, 2D and 3D) by forcing the 5 interpolation coefficients to be 0.0, 1.0 or take their real value. The filtered results are passed on to the Shading Unit and include the filtered texel color, the fragment position (within the tile), a destination register and some handshaking flags. The filtered texel color can be feedback to the Texture Coordinate Unit for bump mapping or any other purpose.

The Shading Unit is a programmable SIMD machine operating on a logical 8×8 array of bytes (i.e. one per fragment position within a tile). The physical implementation uses a 4×4 array to save gate cost. The Shading Unit is passed up to 8 tiles worth of texture data, has storage for 32 plane equations (an RGBA color takes 4 plane equations) and 32 byte constant values. These values are combined under program control and passed to the Pixel Unit, via the Texture Mux Unit, for alpha blending, dithering, logical ops, etc. Fragments within a tile can be deleted so chroma keying or alpha testing is also possible. All synchronisation (i.e. with the texture data) is done automatically in hardware so the program doesn't need to worry where the texture data will come from or when it will turn up.

Typically the Shading Unit program will do some combination of Gouraud shading, texture compositing and application, specular color processing, alpha test, YUV conversion and fogging.

The Shading Unit's processing element is 8 bits wide so takes multiple cycles to process a full color. The ALU has add, subtract, multiply, lerp and a range of logical operations. It does not have divide or inverse square root operations. Saturation arithmetic is also supported and multi byte arithmetic can be done. Programs are limited to 128 instructions and conditionals jumps and subroutines are supported. The arrival of a Tile message initiates the execution of a program and a watchdog timer prevents lockups due to an erroneous program.

In order to support some of the more complex operations such as high order filtering, convolution and go beyond 8 textures per fragment several programs can be run on the same sub tile, with different input data before the final fragment color is produced. This multi pass operation is controlled by the Texture Coordinate Unit. This works in a very similar way as the multi pass operation of the Pixel Unit.

Framebuffer Sub System

The Framebuffer subsystem is responsible for combining the color calculated in the Shading Unit with the color information read from the framebuffer and writing the result back to the framebuffer. Its simplest level of processing is therefore antialiasing coverage, alpha blending, dithering, chroma keying and logical operations, but the same hardware can also be used for doing accumulation buffer operations, multi buffer operations, convolution and T buffer antialiasing. This is also the main focus for 2D operations with most of the other units (except the rasteriser) being quiescent, except perhaps for some of the esoteric 2D operations such as anisotropically filtered perspective text.

The Framebuffer subsystem comprises:

Pixel Address Unit

Pixel Cache

Pixel Unit

Host Out Unit

The heart of this subsystem is the Pixel Unit. This is an 8×8 SIMD array of byte processors very similar to that found in the Shading Unit. It shares the same basic sequencer and ALU as the Shading Unit, but replaces the plane equation evaluator with a mechanism to allow a unique value to be passed to each SIMD element. The interface to the Pixel Cache is a double buffered dual 32 bit register and the interface to the Shading Unit (via the Texture Mux Unit) is a double buffered 32 bit register per SIMD element. The tile mask and pixel mask can be used and tested in the SIMD array and the program storage (128 instructions) is generous enough to hold a dozen or so small programs, typical of 2D processing.

Pixel data received from the Pixel Cache can be interpreted directly as byte data or as 16 bit data in 565 RGB format. No other formats are supported, but they can be emulated (albeit with a potential loss of speed) with a suitable program in the SIMD array. The 565 format is also directly supported when writing back to the Pixel Cache.

In order to support some of the more complex operations such as multi buffer, accumulation buffering, convolution and T buffer antialiasing several programs can be run on the same tile, with different framebuffer and global data before the destination tile is updated. The fragment color data (from the Shading Unit) is held constant for all passes and each pass can write back data to the Pixel Cache. This multipass method removes the need for large amounts of storage in the Pixel Unit and shouldn't cause significant (if any) performance degradation for this class of algorithm. Each Tile message has an extra field to indicate which tile program (first, middle or last) to run and a field which holds the pass number (so that filter coefficients, etc. can be indexed). Any data to be carried over from one pass to the next is held in the local register file present in each SIMD element. Typically the first tile program will do some processing (i.e. multiply the framebuffer color with some coefficient value) and store the results locally. The middle tile program will do the same processing, maybe with a different coefficient value, but add to the results stored locally. The last tile program will do the same processing, add to the results stored locally, maybe scale the results and write them to the Pixel Cache. Multi buffer and accumulation processing would tend to run the same program for each set of input data.

Data being transferred into or out of the SIMD array is done as a byte tile at a time so the input and output buses connected to the Pixel Cache are 512 bits each. Each source or destination read and destination write can be 1 to 4 bytes and by having the transfer done in this planar format keeps this flexibility while minimizing complexity.

The Pixel Cache holds data from memory. Normally this is pixel data from a framebuffer (color buffer), but could be texture data when rendering to a texture map, or depth/stencil data when clearing or blitting the depth buffer. The cache is 4K bytes in size and organized to hold sixteen tiles (8, 16 and 32 bits per pixel tiles all take one tile entry). There is no expectation that this cache will allow massive amounts of locality of reference in the framebuffer to be exploited (which would be the case if the cache were made from eDRAM and be>1M byte in size) so why have such a small cache when it really doesn't save lots of memory bandwidth? Some of the reasons are:

For regular rendering it effectively provides a 16 tile buffer against memory latency so the memory bandwidth is improved, not through reading or writing less data, but by allowing the data to be transferred in larger blocks.

When rendering small primitives one of the key performance features is how pixels shared between the primitives are handled. Earlier solutions either penalized every primitive (but this was hidden by other set up costs) or tried to avoid them in favorable circumstances particularly as the synchronisation path via the memory controller is now much longer than the small primitive processing time. The cache helps on two counts here: Firstly the stalled read will only occur on tiles which overlap in space and time—each destination tile in the cache is marked for update and any attempt to read it when the update flag is set will stall the read. Secondly the synchronisation path is very much shorter and may well be hidden again by the general set up overheads.

It conserves memory bandwidth when rendering small primitives. Traditionally small primitive processing has not stressed the memory bandwidth on earlier architectures. With a tiled system a single pixel triangle takes just as much memory bandwidth to process as a full tile's worth of pixels. With the anticipated triangle throughputs the memory system would not be able to keep up given the requirement to deliver 64×the data going to be used. Small primitives are normally connected, or share the same locality, so caching the tile for one primitive will results in the following several primitives also using the same tile. This clearly reduces the read and write memory bandwidth and with only two primitives sharing the same tile the memory bandwidth will no longer be a bottle-neck.

The memory interface is simplified as the only commands are to read or write an aligned tile of the appropriate depth (1 to 4 bytes). No bit, byte, or fragment level of masking is needed as these are all handled via a suitable program (bit and byte level masking) or by the cache (fragment level masking using the tile mask). When destination reads are disabled, but a partial tile is being processed or a program is able to delete fragments then a destination read is automatically done.

The cache handles non aligned reads by fetching the 2 or 4 aligned tiles and extracting the non aligned tile from them. The next non aligned tile is likely to butt against the tile just processed so the cache will hold half of the tiles needed for this tile. When aligning a tile and storing it in the Pixel Unit the alignment is done a byte plane at a time and takes 1, 2 or 4 cycles depending on the number of aligned tiles needed to fulfill the non aligned tile. In the worst case true color blit this could take 16 cycles, which is equivalent to 4 pixels per clock and is very much slower that the SIMD array will take to just copy the data back to the cache. The more common blit used when scrolling a window is only miss aligned in one dimension so will run twice as fast as the worse case blit.

The cache is very effective as a font cache. The glyph bit map is stored in a bit plane of a 2D set of tiles which define the area of the glyph. The tile set can therefore hold 8, 16 or 32 characters depending on the tile depth, however the cache is most efficiently used with 32 bit tiles. The alignment hardware just mentioned can align the glyph to the destination tile and ALU instructions allow an input bit (of the glyph) to be used for conditional operations (such as selecting between foreground and background colors in opaque text) or to delete fragments (transparent text). If the glyph data is packed into 32 bit tiles then we don't want to spend 16 cycles doing the aligning when 31 of the bits are not of interest. Only the byte holding the relevant bit plane needs to be aligned thereby giving the optimum storage and alignment strategies.

The cache allows a small amount of out of order accesses (reads and writes) to be done to allow the memory system to work more effectively.

The cache is fully associative with a FIFO replacement policy. A cache line is automatically copied back to memory when it is updated if no pending references (from queued up tiles) are present.

The cache has 4 data ports—a pair of 512 bit read and write ports connected to the Pixel Unit and a pair of 512 bit ports to the Memory Pipe Unit. The cache can service accesses from each port concurrently. A dirty bit is maintained per tile so that when the cache line needs to be reused the copy back can be avoided if the data has not changed.

The Pixel Address Unit, in response to a Tile message, will generate a number of tile addresses. Normally this will be a single destination address for writing (and maybe reading), but could be multiple destination addresses or source addresses for some of the multi pass algorithms. The generation of addresses and their meaning is controlled by a small user program. Simple looping with x and y increments and offsets allow convolution and filtering to be done. Limited modulo addressing can be done so a pattern can be repeated across a region. Destination reads and writes are always aligned on tile boundaries, but source reads can have any alignment. The building up of non aligned tiles in the cache is controlled by the Pixel Address Unit as the cache doesn't know how to calculate the neighborhood tile addresses. FIFO buffering is used between and within the cache to allow prefetching.

The Host Out Unit takes data forwarded on by the Pixel Unit via the message stream to be passed back to the host. This is not limited to color data, but could be stencil or depth data as well. Message filtering is done so any message reaching this point other than an upload data message, a sync message or a few other select messages are removed and not placed in the output FIFO. The picking and extent region facilities from earlier chips has not been kept in P10.

Local Buffer Sub System

This subsystem is very similar to the Framebuffer Sub System except is not programmable and only works with aligned tiles. The GID, stencil and depth buffer processing is well understood and there doesn't seem to be much benefit for using a programmable SIMD array to do the processing. Fast clear plane processing was considered but has not been included because the very high fill rates already allow a 1 million pixel 32 bit Z buffer to be cleared 3200 times a second (i.e. it takes 320 $\mu$sec per clear) and the extra speed up does not seem to justify the added cost and complexity.

This subsystem comprises:

LB Address Unit

LB Cache

GID/Stencil/Depth Unit (also known as GSD Unit)

The Stencil/Depth Unit implements the standard GID, stencil and depth processing on 8 (or more) fragments at a time. The depth plane equation is set up by the Depth Set Up Unit (as described earlier). The local buffer pixels are held in byte planar format in memory so can be 8, 16, 24, 32, 40 or 48 bits deep. Conversion to and from the external format of the local buffer pixel is done in this unit. Any clearing or copying of the local buffer is done by the Framebuffer subsystem as it saves having to have suitable masking and aligning logic in this unit. The updated fragment values are written back to the cache and the tile mask modified based on the results of the tests. If the tile mask shows all fragments have been rejected (for whatever reason) then the Tile message is not forwarded on. GID testing and Zmin testing is done on all fragments within a tile simultaneously.

The LB Cache is basically the same as the Pixel Cache and is present for many of the same reasons. No 2D barrel shifter is present as it never has to read non aligned tiles, but each cache line has been extended from 4 to 6 bytes deep.

The LB Address Unit is not programmable like the Pixel Address Unit as it only ever has to read and/or write one aligned tile at a time.

Memory Pipe Unit

The interface to the Memory Controller is via a single read FIFO and a single write FIFO where both FIFOs carry a 512 bit data stream with associated address and routing information. The primary role of the FIFOs is not to queue up requests, but to allow the Memory Controller to be in a different clock domain from the core. The general interface between the various units and the Memory Pipe Unit is shown in FIG. 1E.

The requests for data transfers between the caches and Memory Pipe Unit are FIFO buffered, but the data path is not (it is pipelined for timing integrity reasons). Each cache has its own request queues, but logically share a pair of buses (one per transfer direction). These buses allow the Memory Pipe Unit to read and write any cache location at any time, but are only used to satisfy transfer requests. The philosophy here is to replace the wide and deep data FIFOs in previous architectures with the caches as they provide a lot more flexibility and reuse of data.

The Memory Pipe Unit tracks the requests in the 6 request queues, arbitrates between them and sends requests to the Memory Controller. The priority can be adjusted by software as can the high water marks in the FIFOs. Requests are batched together as successive reads or writes from one source are likely to be to the same page in memory (recall the rasteriser tries to ensure successive tiles hit the same page in memory) and writes to a page open for reading also have a preferential priority.

Miscellaneous Core Units

The Router can change the order of the Texture and Local Buffer subsystems so that when alpha testing isn't being done on a texture map the cheaper and faster depth test can be done first. The Router only varies the message stream path and not the connection between the Texture Mux Unit and Pixel Unit.

According to a disclosed class of innovative embodiments, there is provided: A graphics memory for storing picture data, comprising: a plurality of tiles, each including data for a multi-row patch of spatially adjacent pixels; memory access logic having at least two different modes of operation, wherein in a first mode of operation, said logic provides paralleled access to all rows of at least one selected tile, and in a second mode of operation, said logic provides paralleled access to at least one selected row of multiple tiles.

According to another disclosed class of innovative embodiments, there is provided: A graphics processing method, comprising the steps of: storing computer graphics data in a tile format; and accessing said data in either of two modes, wherein in a first mode of operation, all rows of at least one selected tile are accessed in parallel, and in a second mode of operation, rows having the same position in multiple tiles are accessed in parallel.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Note that other levels of memory, e.g. integrated DRAM, or L2 SRAM, can optionally be added to the illustrated system architecture.

Optionally the user could be given a memory allocation option.

Additional general background, which helps to show variations and implementations, may be found in the following publications, all of which are hereby incorporated by reference: Advances in Computer Graphics (ed. Enderle 1990); Angel, Interactive Computer Graphics: A Top-Down Approach with OpenGL; Angell, High-Resolution Computer Graphics Using C (1990); the several books of "Jim Blinn's Corner" columns; Computer Graphics Hardware (ed. Reghbati and Lee 1988); Computer Graphics: Image Synthesis (ed. Joy et al.); Eberly: 3D Game Engine Design (2000); Ebert: Texturing and Modelling 2.ed. (1998); Foley et al., Fundamentals of Interactive Computer Graphics (2.ed. 1984); Foley, Computer Graphics Principles & Practice (2.ed. 1990); Foley, Introduction to Computer Graphics (1994); Glidden: Graphics Programming With Direct3D (1997); Hearn and Baker, Computer Graphics (2.ed. 1994); Hill: Computer Graphics Using OpenGL; Latham, Dictionary of Computer Graphics (1991); Tomas Moeller and Eric Haines, Real-Time Rendering (1999); Michael O'Rourke, Principles of Three-Dimensional Computer Animation; Prosise, How Computer Graphics Work (1994); Rimmer, Bit Mapped Graphics (2.ed. 1993); Rogers et al., Mathematical Elements for Computer Graphics (2.ed. 1990); Rogers, Procedural Elements For Computer Graphics (1997); Salmon, Computer Graphics Systems & Concepts (1987); Schachter, Computer Image Generation (1990); Watt, Three-Dimensional Computer Graphics (2.ed. 1994, 3.ed. 2000); Watt and Watt, Advanced Animation and Rendering Techniques: Theory and Practice; Scott Whitman, Multiprocessor Methods For Computer Graphics Rendering; the SIGGRAPH Proceedings for the years 1980 to date; and the IEEE Computer Graphics and Applications magazine for the years 1990 to date. These publications (all of which are hereby incorporated by reference) also illustrate the knowledge of those skilled in the art regarding possible modifications and variations of the disclosed concepts and embodiments, and regarding the predictable results of such modifications.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A graphics processor for storing picture data, comprising:

a plurality of tiles, each including data for a multi-row patch of spatially adjacent pixels; and a graphics controller comprising:

memory access logic having at least two different modes of operation, wherein in a first mode of operation, said logic provides paralleled access to all rows of at least one selected tile, and in a second mode of operation, said logic provides paralleled access to at least one selected row of multiple tiles.

2. The graphics processor of claim 1, wherein said tiles each include less than all bits of data for all pixels in a patch.

3. The graphics processor of claim 1, wherein at least some ones of said tiles have different respective row-address-bit permutations.

4. A graphics processing method, comprising the steps of:

storing computer graphics data in a tile format; and accessing said data in either of two modes, wherein in a first selectable mode of operation, all rows of at least one selected tile are accessed in parallel, and in a second selectable mode of operation, rows having the same position in multiple tiles are accessed in parallels;

wherein said accessing step of accessing in either of two modes is performed by a graphics controller having memory access logic.

5. The graphics processing method of claim 4, wherein said tiles each include less than all bits of data for all pixels in a patch.

6. The graphics processing method of claim 4, wherein at least some ones of said tiles have different respective row-address-bit permutations.

* * * * *